Aug. 7, 1962 E. G. ISRAELSON 3,048,255
MEANS FOR CUSHIONING CARRIAGE RETURN AND TABULATION
Filed June 3, 1959

INVENTOR.
EVERT G. ISRAELSON
BY Clyde A. Norton +
Robert D. Hulsizer.
ATTORNEY

United States Patent Office 3,048,255
Patented Aug. 7, 1962

3,048,255
MEANS FOR CUSHIONING CARRIAGE RETURN
AND TABULATION
Evert G. Israelson, Rowayton, Conn., assignor to Sperry
Rand Corporation, New York, N.Y., a corporation of
Delaware
Filed June 3, 1959, Ser. No. 817,825
9 Claims. (Cl. 197—183)

This invention relates to new and useful improvements in typewriters and has particular reference to the provision of simple, efficient, and economical means for cushioning or breaking the shock occurring in such machine during tabulation and carriage return.

A main object of the invention is to provide a unitary means to check the energy of typewriter carriages on return and tabulation and thereby reduce rebound, shock, wear on the parts, and noise.

Another object is to provide a mechanism of few economical parts which can be attached to a typewriter at relatively small expense.

In the operation of typewriters it is well known, in connection with tabulation, to have a more or less permanently positioned tabulator blade or stop capable of being elevated into the path of an adjustable stop member on the tabulator rack. Likewise, in carriage return, there is a more or less permanently positioned stop element adapted to be engaged by an adjustable margin stop on the carriage rack.

The essence of this invention is to provide checking elements between the respective pairs of tabulator and carriage stops above mentioned so that the movable stop element of each pair will engage its checking element prior to the time when it would ordinarily engage its more or less permanent stop. These checking elements are connected by suitable linkage to a common braking member, which may take the form of a dash pot, and the linkages are so connected and related that the operation of one linkage will operate the braking member without affecting the other linkage and vice versa.

Figure 1:
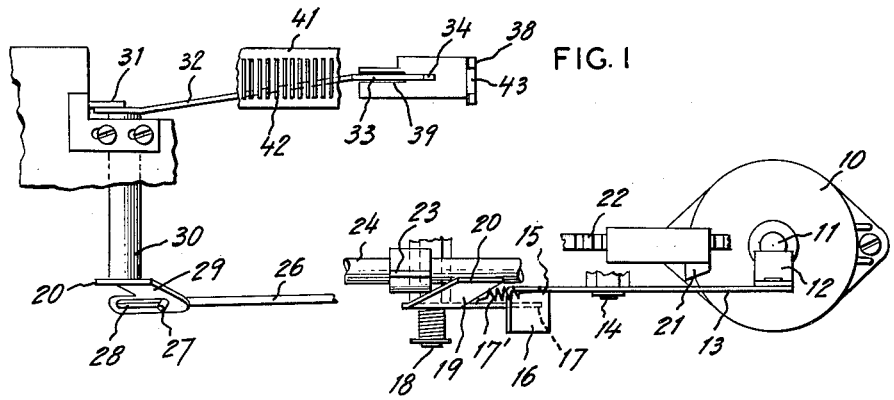
Figure 2:
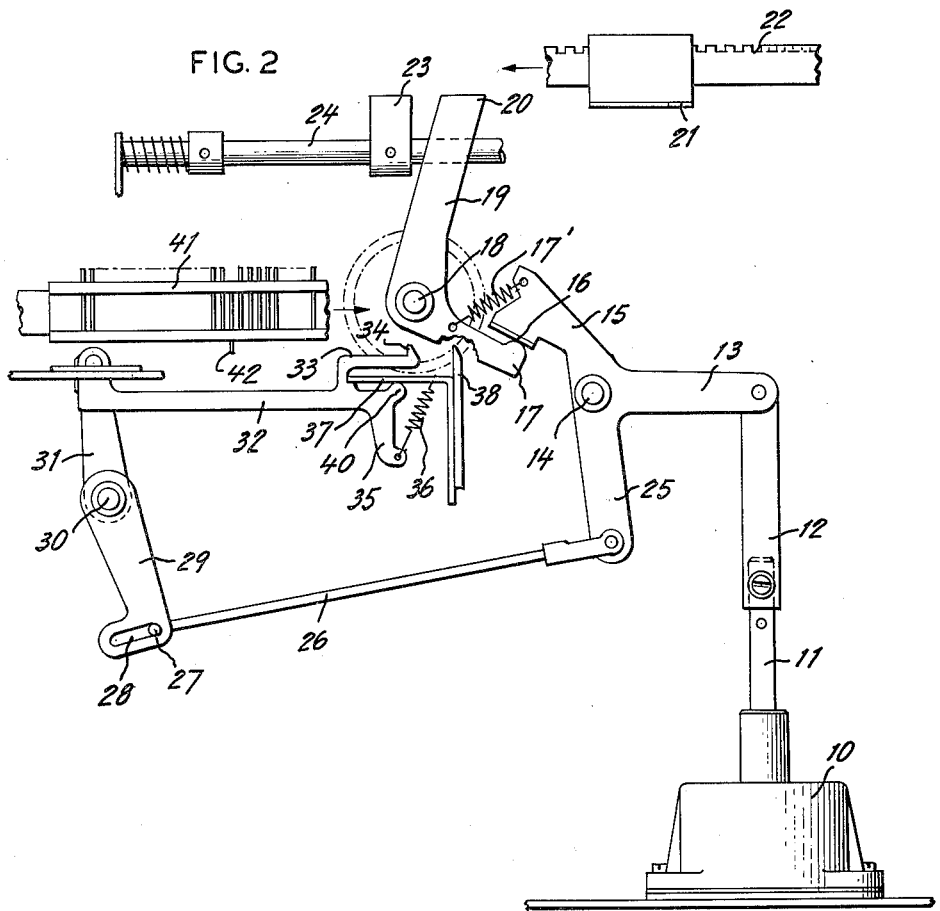

The present preferred form which the invention may assume is illustrated in the drawings, of which FIG. 1 is a plan view of the mechanisms in normal position; and FIG. 2 is a side elevation thereof.

The views set forth only the mechanisms involved in the invention with the parts of the typewriter which cooperate therewith. With modern power operated typewriters the shock sustained by the parts on tabulation and carriage return is quite heavy and the invention was developed to cushion the shock by the use of as few simple and efficient parts as possible and so correlated as to permit the invention to be easily installed on machines already in use.

In the drawings there is seen a braking element such as a dash pot 10 of any suitable type which as a stem 11 pivotally connected to a link 12 which in turn is pivotally connected to one arm 13 of a dash pot bell crank which is rotatable on a shaft 14. Another arm 15 of the dash pot bell crank is provided on its end with a flanged lip 16 against which normally lies the rounded end of an arm 17 of a checking bell crank rotatably pivoted on a shaft 18. The other arm 19 of this last mentioned bell crank extends upwardly and its upper end 20 acting as a checking element lies in the path of the usual margin stop 21 adjustably disposed on the usual carriage rack 22. A spring 17' extends between arms 15 and 17 of both bell cranks. As the carriage is returned the margin stop 21 moves to the left and encounters the upper end 20 or checking element. This moves the arms 19 and 17 counter clock-wise thus moving the arms 15 and 13 clockwise and depressing the link 12 and stem 11. This will meet the resistance of the dash pot 10 and brake the movement of the carriage before the stop 21 encounters and comes to rest against the usual stop 23 which is disposed in the usual manner on a rod 24 in a substantially fixed position. The stop 23 is in a plane adjacent that of the arm 19 so that it will not interfere with the operation of said arm.

The bell crank mounted on the shaft 14 has another arm 25 to the end of which is pivotally connected one end of a link 26 the other end of which has a stud 27 thereon slidable in a slot 28 on the outer end of an arm 29 fixed to shaft 30. Fixed to this same shaft is another arm 31 to the upper end of which is pivotally connected a long narrow arm 32 the other end of which is forked to provide an upper limb 33 with a stop finger 34 or checking element at its outer end and a lower dependent limb 35 the lower end of which is connected by a spring 36 to a bracket plate 37 extending horizontally from the usual tabulator stop bar 38. The outer end of the arm 32 has a rounded portion 40 which is adapted to bear and slide along the bottom of the bracket plate 37 and is held thereagainst by the spring 36.

There is provided the usual tabulator rack 41 with depressible tabulator stops 42 and when tabulation takes place the stop 42 moves to the right and encounters first the stop finger 34. In this encounter the finger 34 and the arm 32 on which it is mounted move to the right causing the movement of the arm 29 in a clock-wise direction thus moving the link 26 to the left causing the clock-wise motion of arms 25 and 13 and the depression of the link 12, and thus bringing the dash pot into play as before.

As the arm 32 moves to the right it enters the slot 39 and continues this motion until the stop 42 engages with the tabulator bar 38. This bar which is in a fixed position when elevated is provided with a notch 43 in its upper surface to permit this motion and on each side of this notch the upper edge of the bar protrudes upwardly to act as a barrier for the stop 42 to come to rest after the motion of the tabulator rack has been braked in the manner described.

It will be noted that in the normal position of the parts the stud 27 lies in the right hand end of the slot 28 so that the motion of the link 26 to the left will not affect the arm 29. Thus I have provided two simple cooperative mechanisms which effectively brake either carriage return or tabulation and employ only one dash pot for the purpose, and are independently operable.

What I claim is:

1. In a typewriter having a tabulator rack, an adjustable stop on said rack, a permanent stop related to and in the path of the adjustable stop, a carriage rack with an adjustable stop thereon, and a permanent stop related to and in the path of the last mentioned adjustable stop, the invention which comprises check elements between the respective permanent and adjustable stops and yieldably movable into lateral alignment with said permanent stops by said adjustable stops, a braking member, and connections between the check elements and the braking member whereby the operation of either check element will operate the braking member until either check element is moved into lateral alignment with its corresponding permanent stop by its respective adjustable stop.

2. The invention of claim 1 in which the connections are linkages, said linkages being so related that the operation of one linkage will not affect the operation of the other and vice versa.

3. The invention of claim 1 in which the connections comprise a three-armed bell crank one arm of which is connected to the braking member, another arm of which is associated with one check element, and a third arm of which is associated with the other check element, the connection between the last mentioned arm and its check element being such as to permit the operation of the braking member by the first mentioned check element without affecting the normal position of the second check element.

4. The invention of claim 3 in which the second check element is pivotally mounted on one end of a bell crank, the other end of which is provided with an elongate slot, and a link extends from the third arm of the first mentioned bell crank and has a stud thereon lying normally in one end of said slot whereby the operation of the first check element will move the link but will not operate the second mentioned bell crank.

5. In a typewriter having a tabulator rack, an adjustable stop on said rack, a permanent stop related to and in the path of the adjustable stop, a carriage rack with an adjustable stop thereon, and a permanent stop related to and in the path of the last mentioned adjustable stop, the invention which comprises a braking member having a stem, a three-armed bell crank lever pivotally mounted, one arm of said bell crank being connected to said stem, a two-armed bell crank pivotally mounted with one arm thereof disposed below a second arm of said three-armed bell crank, the other arm of said two-armed bell crank acting as a check element and lying in the path between the permanent and adjustable stops related to the carriage rack, another two-armed bell crank, pivotally mounted, one arm of said last mentioned bell crank having a slot therein, a link connected at one end to the third arm of said three-armed bell crank, a stud on the other end of said link and lying in said slot, a second check element pivotally mounted on the second arm of said last mentioned two-armed bell crank, and means for lifting said last mentioned checking element into the path between the permanent and adjustable stops related to the tabulator rack, said slot and stud connection permitting the operation of the braking member by either checking element independently of the other checking element.

6. In a typewriter having a tabulator rack, an adjustable stop on said rack, a permanent stop related to and in the path of the adjustable stop, a carriage rack with an adjustable stop thereon, and a permanent stop related to and in the path of the last mentioned adjustable stop, the invention which comprises check elements between the respective permanent and adjustable stops, a braking member, and connections between the check elements and the braking member whereby the operation of either check element will operate the braking member, said connections comprising a three-armed bell crank one arm of which is connected to the braking member, another arm of which is associated with one check element, and a third arm of which is associated with the other check element, the connection between the last mentioned arm and its check element being such as to permit the operation of the braking member by the first mentioned check element without affecting the normal position of the second check element.

7. The invention of claim 6 in which the second check element is pivotally mounted on one end of a bell crank, the other end of which is provided with an elongate slot, and a link extends from the third arm of the first mentioned bell crank and has a stud thereon lying normally in one end of said slot whereby the operation of the first check element will move the link but will not operate the second mentioned bell crank.

8. In a typewriter having a movable rack, an adjustable stop on said rack, and a stop member disposed in a permanent position in the path of movement of said adjustable stop, the combination comprising a check element pivotally mounted on a shaft disposed between said stops, and rotatable past and in a plane adjacent said permanently positioned stop member by said adjustable stop, a braking member, and a connection between the check element and the braking member to operate the braking member when the adjustable stop encounters the check element during the movement of said adjustable stop to engage said permanently positioned stop.

9. The combination of claim 8 in which the connection is a combination linkage and spring means, said spring means restoring said check element to its normal position.

References Cited in the file of this patent

UNITED STATES PATENTS

| | | |
|---|---|---|
| 1,090,219 | Kurowski | Mar. 17, 1914 |
| 1,516,685 | Rinsche | Nov. 25, 1924 |
| 2,283,565 | Michelsen | May 19, 1942 |
| 2,315,992 | Von Reppert | Apr. 6, 1943 |
| 2,854,124 | Dodge et al. | Sept. 30, 1958 |